US012640419B2

(12) United States Patent
Patil et al.

(10) Patent No.: US 12,640,419 B2
(45) Date of Patent: May 26, 2026

(54) BATTERY MODULE WITH PRE-FORMED BATTERY CELL THERMAL BARRIER

(71) Applicant: GM GLOBAL TECHNOLOGY OPERATIONS LLC, Detroit, MI (US)

(72) Inventors: Chinmaya Patil, South Lyon, MI (US); Venkata Prasad Atluri, Novi, MI (US); Teresa U. Holiness-Stalling, Detroit, MI (US); John Patrick Spicer, Plymouth, MI (US); Miguel Arturo Saez, Clarkston, MI (US); David A. Okonski, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 639 days.

(21) Appl. No.: 18/089,716

(22) Filed: Dec. 28, 2022

(65) Prior Publication Data

US 2024/0222743 A1     Jul. 4, 2024

(51) Int. Cl.
| | |
|---|---|
| *H01M 10/50* | (2006.01) |
| *H01M 10/658* | (2014.01) |
| *H01M 50/244* | (2021.01) |
| *H01M 50/249* | (2021.01) |
| *H01M 50/264* | (2021.01) |
| *H01M 10/48* | (2006.01) |

(52) U.S. Cl.
CPC ....... *H01M 10/658* (2015.04); *H01M 50/244* (2021.01); *H01M 50/249* (2021.01); *H01M*

*50/264* (2021.01); *H01M 10/48* (2013.01); *H01M 2220/20* (2013.01)

(58) Field of Classification Search
CPC ............. H01M 10/658; H01M 10/659; H01M 10/656; H01M 10/655; H01M 10/48; H01M 10/482; H01M 50/249; H01M 50/264; H01M 50/244; H01M 2220/20
See application file for complete search history.

(56) References Cited

U.S. PATENT DOCUMENTS

| | | | | |
|---|---|---|---|---|
| 2006/0266542 A1* | 11/2006 | Yoon | .................... | H01M 50/209 174/112 |
| 2021/0197689 A1* | 7/2021 | Reimer | ................... | B60L 50/66 |

* cited by examiner

*Primary Examiner* — Raymond Alejandro
(74) *Attorney, Agent, or Firm* — CANTOR COLBURN LLP

(57)     ABSTRACT

A pre-formed battery cell thermal barrier for a battery module includes a plurality of conductively coupled electrochemical cells and a pre-formed thermal barrier. The battery module can further include a cell holder configured to receive the plurality of conductively coupled electrochemical cells and the pre-formed thermal barrier. The pre-formed thermal barrier includes a cured potting material insertable into a cell-to-cell space in the battery module. The pre-formed thermal barrier includes one or more locking features configured to physically interlock with one or more corresponding locking features of the cell holder.

20 Claims, 7 Drawing Sheets

700

702

704

706

708

BATTERY MODULE WITH PRE-FORMED BATTERY CELL THERMAL BARRIER

INTRODUCTION

The subject disclosure relates to battery cell technologies, and particularly to a pre-formed battery cell thermal barrier in automotive applications.

High voltage electrical systems are increasingly used to power the onboard functions of both mobile and stationary systems. For example, in motor vehicles, the increasing demand to improve fuel economy and reduce emissions has led to the development of advanced electric vehicles (EVs). EVs rely upon Rechargeable Energy Storage Systems (RESS), which typically include one or more high voltage battery packs, and an electric drivetrain to deliver power from the battery to the wheels. Battery packs can include any number of interconnected battery modules depending on the power needs of a given application. Each battery module includes a collection of conductively coupled electrochemical cells. The battery pack is configured to provide a Direct Current (DC) output voltage at a level suitable for powering a coupled electrical and/or mechanical load (e.g., an electric motor).

Battery packs can be repeatedly charged and discharged, particularly in motor vehicle applications, causing the temperature in the electrochemical cells in each battery module to increase. Thermal management systems serve to mitigate these thermal effects, as increased temperatures and excessive heat generation may deteriorate the performance of the battery cells.

SUMMARY

In one exemplary embodiment a battery module can include a plurality of conductively coupled electrochemical cells and a pre-formed thermal barrier. The battery module can further include a cell holder configured to receive the plurality of conductively coupled electrochemical cells and the pre-formed thermal barrier. The pre-formed thermal barrier includes a cured potting material insertable into a cell-to-cell space in the battery module.

In addition to one or more of the features described herein, in some embodiments, the pre-formed thermal barrier includes one or more cell cavities. In some embodiments, each cell cavity includes a cell holder dimension corresponding to one cell of the plurality of conductively coupled electrochemical cells.

In some embodiments, the pre-formed thermal barrier further includes a second potting material having a greater density than the cured potting material. In some embodiments, the pre-formed thermal barrier further includes one or more sensors embedded in the cured potting material.

In some embodiments, the pre-formed thermal barrier includes one or more locking features configured to physically interlock with one or more corresponding locking features of the cell holder.

In some embodiments, the cell holder includes a top cell holder and a bottom cell holder. In some embodiments, a first locking feature of the pre-formed thermal barrier includes a first extension, and the top cell holder and the bottom cell holder each include a second locking feature. In some embodiments, the second locking features include a shaped recess adapted to conformally house the first locking feature when the pre-formed thermal barrier is installed in the cell holder.

In another exemplary embodiment a vehicle includes an electric motor and a battery pack electrically coupled to the electric motor. The battery pack can include one or more battery modules. Each battery module includes a plurality of conductively coupled electrochemical cells, a pre-formed thermal barrier, and a cell holder configured to receive the plurality of conductively coupled electrochemical cells and the pre-formed thermal barrier. The pre-formed thermal barrier includes a cured potting material insertable into a cell-to-cell space in the battery module.

In yet another exemplary embodiment a method for providing a thermal barrier for a battery module can include providing a plurality of conductively coupled electrochemical cells, forming a pre-formed thermal barrier including a cured potting material, and forming a cell holder configured to receive the plurality of conductively coupled electrochemical cells and the pre-formed thermal barrier. The method can include inserting the pre-formed thermal barrier into a cell-to-cell space in the battery module.

In some embodiments, the pre-formed thermal barrier and the cell holder are monolithically formed. In some embodiments, the cured potting material includes a foam and the cell holder includes a material having a higher density than the foam.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
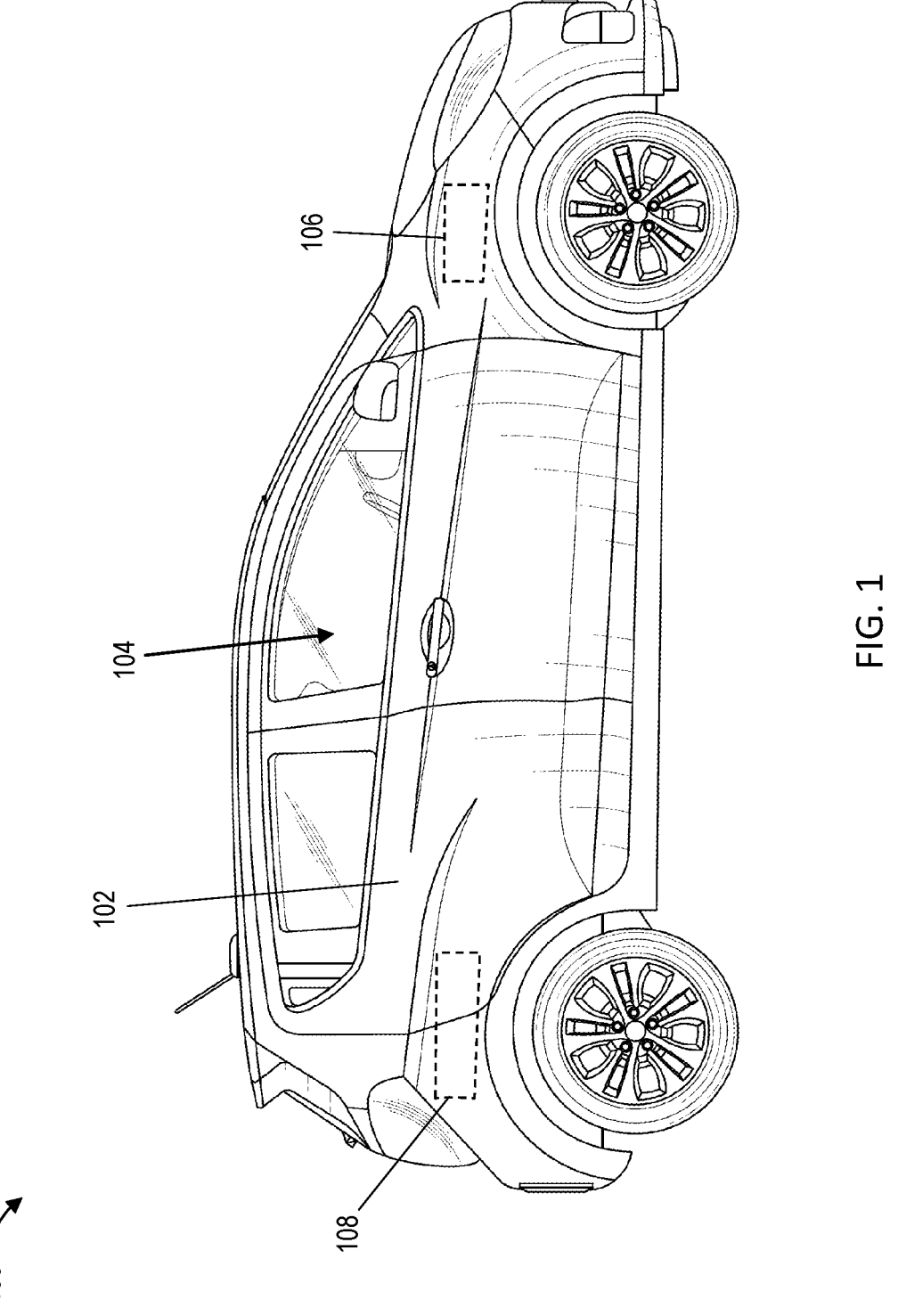
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure. As will be detailed herein, the electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure.

As discussed previously, battery packs (e.g., the battery pack 108) can be repeatedly charged and discharged, particularly in motor vehicle applications, causing the temperature in the electrochemical cells in each battery module (refer to FIG. 3) of the battery pack 108 to increase. Conventional thermal management systems rely on cell-to-cell thermal barrier materials, typically liquid epoxy, that can be dispensed into the cell spacing in each respective module. These thermal barrier materials are then left to cure over an extended period (e.g., 6 to 24 hours, or longer) to complete the module assembly process.

Unfortunately, the fabrication of these epoxy-based thermal management systems is inherently limited by the cure process, leading to manufacturing and assembly issues, such as poor cycle times, the need for large storage areas for stacking modules under cure, rework, etc. The curing process typically includes a fairly short potting life (i.e., the time during which the thermal barrier material can easily flow into the module cavity prior to foaming, for example, 180 seconds) and a limited tack-free time (i.e., the time after foaming during which the thermal barrier material can be somewhat manipulated in a paste-like form prior to setting, for example, a few minutes). Consequently, dispensing defects must be fixed, if at all, almost immediately. Many defects are not discovered until after setting, resulting in degraded and/or ineffective thermal management.

This disclosure introduces a way to ensure proper thermal management in each battery module without requiring a lengthy curing process. In some embodiments, a thermal management potting material (or simply, potting material) is pre-formed to accommodate a predetermined cell spacing/ configuration. During battery module assembly, the pre-formed potting material is inserted into a rigid cell spacing and joined to a plurality of cells via adhesives. Notably, the cure time for the adhesives can be measured in minutes, compared to hours for conventional cell-to-cell thermal barrier materials.

Battery modules constructed using pre-formed battery cell thermal management barriers in accordance with one or more embodiments offer several technical advantages over prior thermal management solutions. In particular, reducing the curing time from hours (or days) to minutes greatly diminishes (virtually eliminates) the need to store banks of curing battery modules. Pre-formed potting materials can be made in bulk, and can be cut to a desired module size during assembly, greatly increasing manufacturability and the flexibility of the battery pack fabrication module. In some embodiments, the pre-formed material includes one or more locking features for precise alignment and locating within the cell holders to increase structural rigidity and eliminate the need for secondary adhesives when attaching the barrier to cell holders and cells. The resultant battery module offers increased manufacturing consistency and thermal performance over sprayed/injected thermal management materials.

Figure 2:
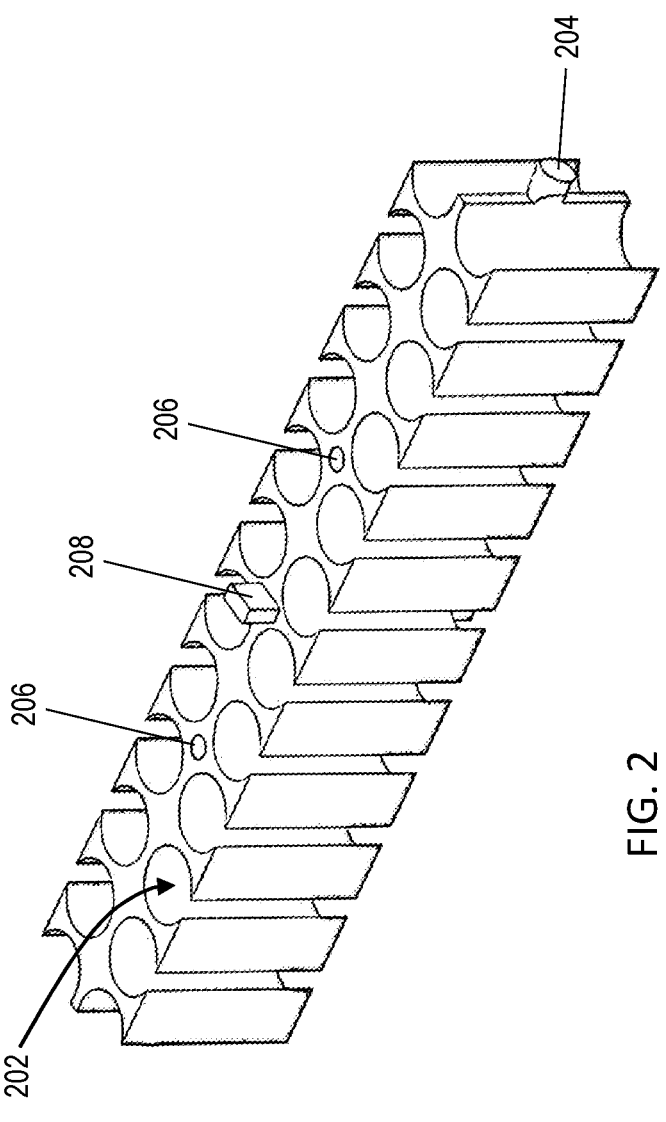
FIG. 2 is a perspective view of a pre-formed thermal barrier in accordance with one or more embodiments.
Figure 2:

FIG. 2 illustrates a perspective view of a pre-formed thermal barrier 200 in accordance with one or more embodiments. The pre-formed thermal barrier 200 can be included, for example, in a battery module (see FIG. 3) of a battery pack of an electric vehicle (e.g., the battery pack 108 of FIG. 1). In some embodiments, the pre-formed thermal barrier 200 includes one or more cell cavities 202. In some embodiments, the pre-formed thermal barrier 200 can include an N×M array of cell cavities 202. For example, the pre-formed thermal barrier 200 can include a 2×10 array of cell cavities 202 (as shown). The number and configuration of the cell cavities 202 in the pre-formed thermal barrier 200 is not meant to be particularly limited and all configurations are within the contemplated scope of this disclosure. Moreover, while the pre-formed thermal barrier 200 is shown as having a number of substantially identical cell cavities 202 separated at an approximately identical pitch (e.g., centerline-to-centerline distance), the size, shape, and arrangement of the cell cavities 202 need not be so limited.

In some embodiments, the pre-formed thermal barrier 200 includes a pre-molded potting material, such as, for example, a polyurethane foam material. Polyurethane is a very versatile material that can be tailored to have specific properties, such as a targeted density, thermal conductivity, and electrical resistance. In some embodiments, the pre-formed thermal barrier 200 includes polyurethan foam having a cured density of less than 0.25 g/cm$^3$. In some embodiments, the pre-formed thermal barrier 200 includes polyurethan foam having a thermal conductivity of less than or equal to 0.15 W/mK. In some embodiments, the pre-formed thermal barrier 200 includes polyurethan foam having an electrical conductivity (dielectric strength of greater than V/mm. In some embodiments, the pre-formed thermal barrier 200 includes polyurethan foam impregnated and/or otherwise combined (via mixing, dispersion, etc.) with a flame resistant material. In some embodiments, the pre-formed thermal barrier 200 exhibits elasticity, such that the cured material will return to an original shape after compression. Elasticity allows for the pre-formed thermal barrier 200 to ensure close contact with installed battery cells (refer to FIG. 3) after the cells are loaded into the foam.

In some embodiments, the pre-formed thermal barrier 200 is produced using a molding process. In some embodiments, the pre-formed thermal barrier 200 is produced using low-pressure (e.g., under 5 atm) injection molding. The injection molding process involves dispensing a potting material reaction mixture into a mold (not separately shown). In some embodiments, the mold is fabricated as a negative to determine the shape of the foamed (dispensed) potting material component. The dispensed potting material reaction mixture can include, for example, a polyurethane liquid spray or foam, a curing agent, and/or an activator. Other methods of making a foam part include, for example, open-cast molding, compression molding, and/or spin cast molding.

Additional components can be introduced during the molding process. In some embodiments, the molding process includes an insert module (e.g., insert molding). Components, such as electrical interconnects or sensor wiring, can be inserted into a mold prior to injecting the potting material into the mold. After the foam cures, the foam part, which includes the inserted components, is released from the mold.

In some embodiments, a release agent such as silicone is applied to the mold before injecting the potting material mixture. The release agent allows for the pre-formed thermal barrier 200 (e.g., cured foam) to be more readily released from the mold. In some embodiments, the mold is configured with draft angles (e.g. 1-2 degrees) to facilitate an easier release from the mold.

After molding, the pre-formed thermal barrier 200 can be inspected to ensure a consistent, filled mold without any large voids. As used herein, a "large" void refers to any void having a volume larger than a predetermined volume, such as, for example, 10 microns, 3 microns, etc. Inspection methods may include manual visual inspection, machine vision inspection, 3D scanning, and/or weighing the foam (observe that weighing a foam having a known density allows one to indirectly determine the packing density and/or presence of voids in the pre-formed thermal barrier 200).

In some embodiments, the pre-formed thermal barrier 200 includes one or more locking features 204, 206. 208. The locking features 204, 206, 208 can be configured to physically interlock with one or more corresponding features of a cell holder (refer to FIG. 3), reducing movement and improving fastening to the cell holder. While not meant to be particularly limited, the locking features 204, 206, 208 can include, for example, one or more extension features (e.g., the locking features 204 and 208) and one or more cavities and/or trenches (e.g., the locking feature 206). In some embodiments, the locking features 204, 208 are sized, spaced, and/or otherwise configured to insert into a corresponding slot, cavity, and/or trench in a cell holder. In some embodiments, the locking features 206 are sized, spaced, and/or otherwise configured to receive a corresponding extension member from the cell holder.

Figure 3:
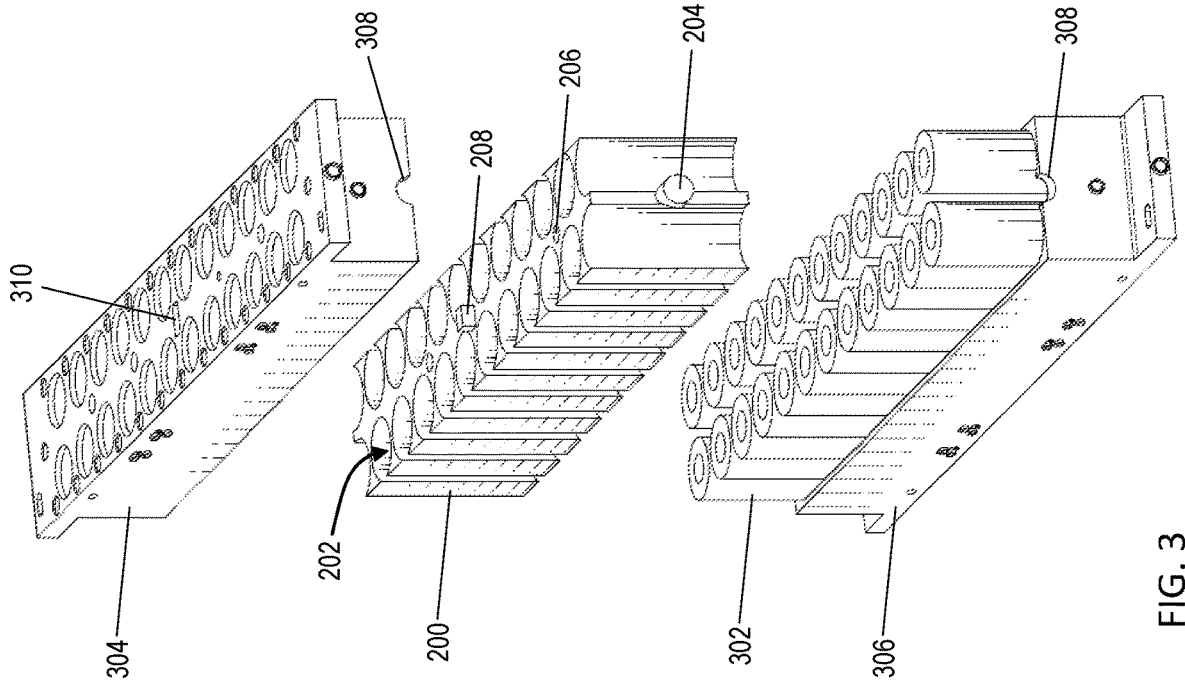
FIG. 3 is a disassembled view of a battery module in accordance with one or more embodiments.

FIG. 3 illustrates a disassembled view of a battery module 300 in accordance with one or more embodiments. The battery module 300 includes a pre-formed thermal barrier (e.g., the pre-formed thermal barrier 200 in FIG. 2), one or more cells 302, and a cell holder (e.g., a top cell holder 304 and a bottom cell holder 306). As discussed previously, the number of cells (and, correspondingly, the number of cell cavities 202 in the pre-formed thermal barrier 200) is not meant to be particularly limited.

As shown in FIG. 3, the cell cavities 202 are shaped to conform to the shape of the cells 302, which can be inserted into the cell cavities 202 in the pre-formed thermal barrier 200. In some embodiments, the top cell holder 304 and/or the bottom cell holder 306 include a cavity or recess (not separately shown) configured to receive the cells 302 and the pre-formed thermal barrier 200. In other words, the cells 302 and the pre-formed thermal barrier 200 can be installed within and between the top cell holder 304 and the bottom cell holder 306.

As further shown in FIG. 3, the top cell holder 304 and the bottom cell holder 306 can include any number of locking features to secure the pre-formed thermal barrier 200. In some embodiments, the locking features include locking features configured and arranged to receive and/or interlock with one or more extension features of the pre-formed thermal barrier 200. For example, the top cell holder 304 and the bottom cell holder 306 can include locking features 308 configured to interlock with the locking feature 204 of the pre-formed thermal barrier 200. In another example, the top cell holder 304 (and/or the bottom cell holder 306) can include locking features 310 configured to interlock with the locking feature 208 of the pre-formed thermal barrier 200. In yet another example, the top cell holder 304 (and/or the bottom cell holder 306) can include extension features configured to extend into the locking feature 206 of the pre-formed thermal barrier 200.

The number, size, and arrangement of the locking features shown in FIG. 3 is for illustrative purposes only and is not meant to be particularly limited. In some embodiments, one or more locking features are included on each major surface (top, bottom, each side, front, and back) of the top cell holder 304, the bottom cell holder 306, and/or the pre-formed thermal barrier 200 to ensure rigidity in all three spatial dimensions.

Figure 4:
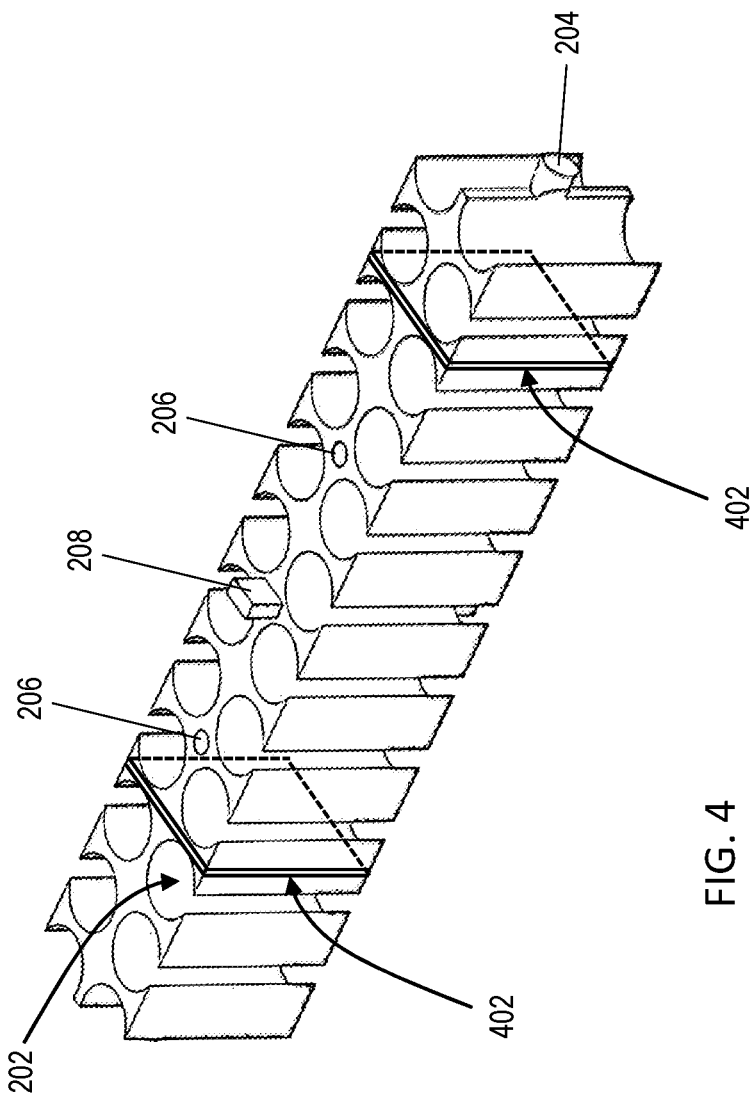
FIG. 4 is a perspective view of a pre-formed thermal barrier having embedded structural inserts in accordance with one or more embodiments.

FIG. 4 illustrates a perspective view of a pre-formed thermal barrier 200 in accordance with one or more embodiments. The pre-formed thermal barrier 200 shown in FIG. 4 can be constructed in a similar manner as discussed with respect to FIG. 2, except that the pre-formed thermal barrier 200 shown in FIG. 4 includes one or more structural inserts 402. While shown as having two structural inserts 402 having a particular configuration for ease of illustration and discussion, the number, placement, and configuration of the structural inserts 402 is not meant to be particularly limited. Moreover, it should be understood that each of the structural inserts 402 can have a same shape, or a different shape, from that of the other structural inserts 402. All such configurations are within the contemplated scope of this disclosure.

The structural inserts 402 can be made of a same or different material than the bulk material (e.g., potting material) of the pre-formed thermal barrier 200. In some embodiments, the structural inserts 402 are made of a material having a higher density and/or stiffness (rigidity) than a material of the pre-formed thermal barrier 200. For example, if the cured density of the potting material of the pre-formed thermal barrier 200 is less than 0.25 g/cm$^3$ then the density of the structural inserts can be greater than or equal to 0.25 g/cm$^3$. In this manner, the structural inserts 402 serve to increase the structural stability of the pre-formed thermal barrier 200.

In some embodiments, the structural inserts 402 are incorporated into the pre-formed thermal barrier 200 during the molding process. For example, the structural inserts 402 can be made of a material (e.g., plastic, metal, etc.) manufactured separately from, and placed within, a mold prior to foam injection (i.e., injection of the potting material reaction mixture). After curing, the thermal barrier material and the structural inserts 402 together define a pre-formed thermal barrier 200.

In some embodiments, the structural inserts 402 are defined during the molding process by controlling the molding temperature in one or more regions of the mold (not separately shown) to induce spatial features (e.g., shape, density, etc.) within the injected foam corresponding to the structural inserts 402. For example, a heating element (not separately shown) adjacent to a location of the mold corresponding to the desired location for one or more of the structural inserts 402 can be adjusted to induce formation of the structural inserts 402 within the pre-formed thermal barrier 200.

Figure 5:
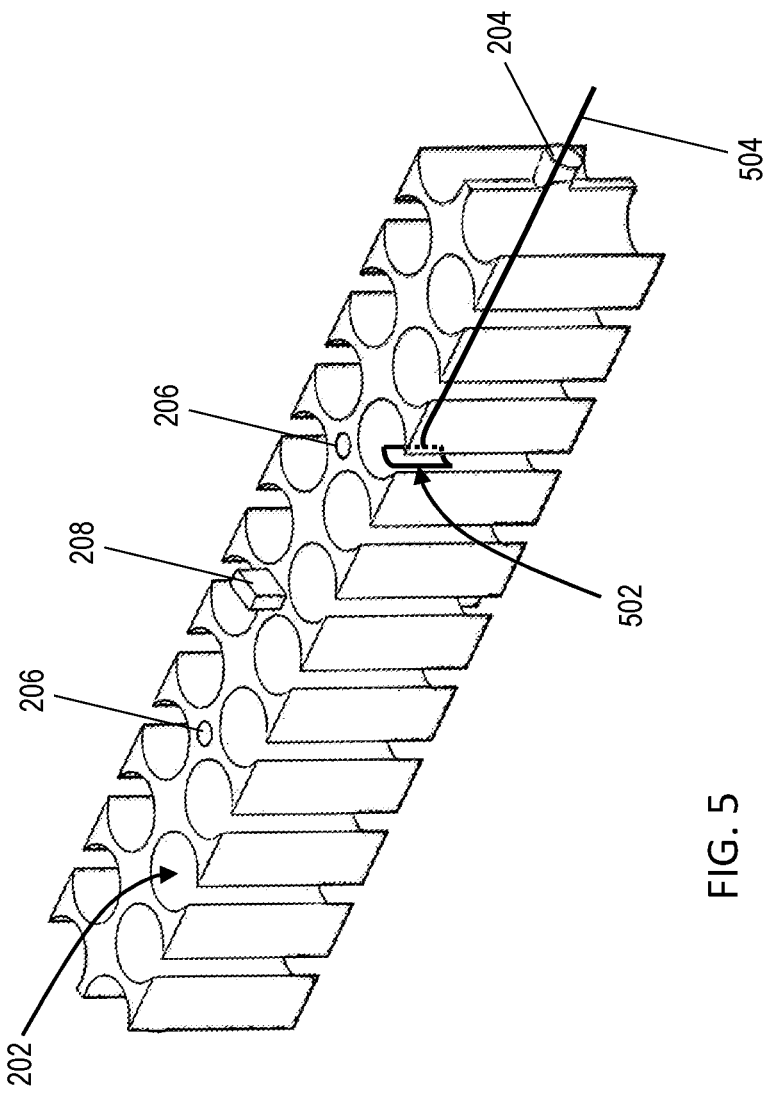
FIG. 5 is a perspective view of a pre-formed thermal barrier having embedded sensors in accordance with one or more embodiments.
Figure 5:

FIG. 5 illustrates a perspective view of a pre-formed thermal barrier 200 in accordance with one or more embodiments. The pre-formed thermal barrier 200 shown in FIG. 5 can be constructed in a similar manner as discussed with respect to FIG. 2, except that the pre-formed thermal barrier 200 shown in FIG. 5 includes one or more sensors 502 and one or more corresponding sensor wires 504. While shown as having a single sensor 502 for ease of illustration and discussion, the number, placement, and configuration of the sensor(s) 502 is not meant to be particularly limited. All such configurations are within the contemplated scope of this disclosure. The sensors 502 and the sensor wires 504 together define an active thermal barrier monitoring system.

The sensors 502 can include any number of sensor types and configurations. For example, the sensors 502 can include cell skin temperature sensors, humidity sensors, pressure sensors, etc. The sensors 502 can be coupled to one or more sensor wires 504 for signal transmission. The one or more sensor wires 504 can be made of any suitable conductive material, such as, for example, a metal (e.g., copper, tungsten, etc.).

In some embodiments, the one or more sensor wires 504 are remotely coupled to one or more external system, such as, for example, a battery monitoring module, processor and/or circuitry (not separately shown). For example, the sensors 502 can include one or more embedded temperature sensors configured to transmit a temperature signal over the sensor wires 504 to one or more downstream components.

In some embodiments, the sensors 502 are incorporated within the pre-formed thermal barrier 200 during the molding process. For example, the sensors 502 can be manufactured separately from, and placed (embedded) within, a mold prior to foam injection (i.e., injection of the potting material reaction mixture). After curing, the sensors 502 are fixed within the cured thermal barrier material of the pre-formed thermal barrier 200.

Figure 6:
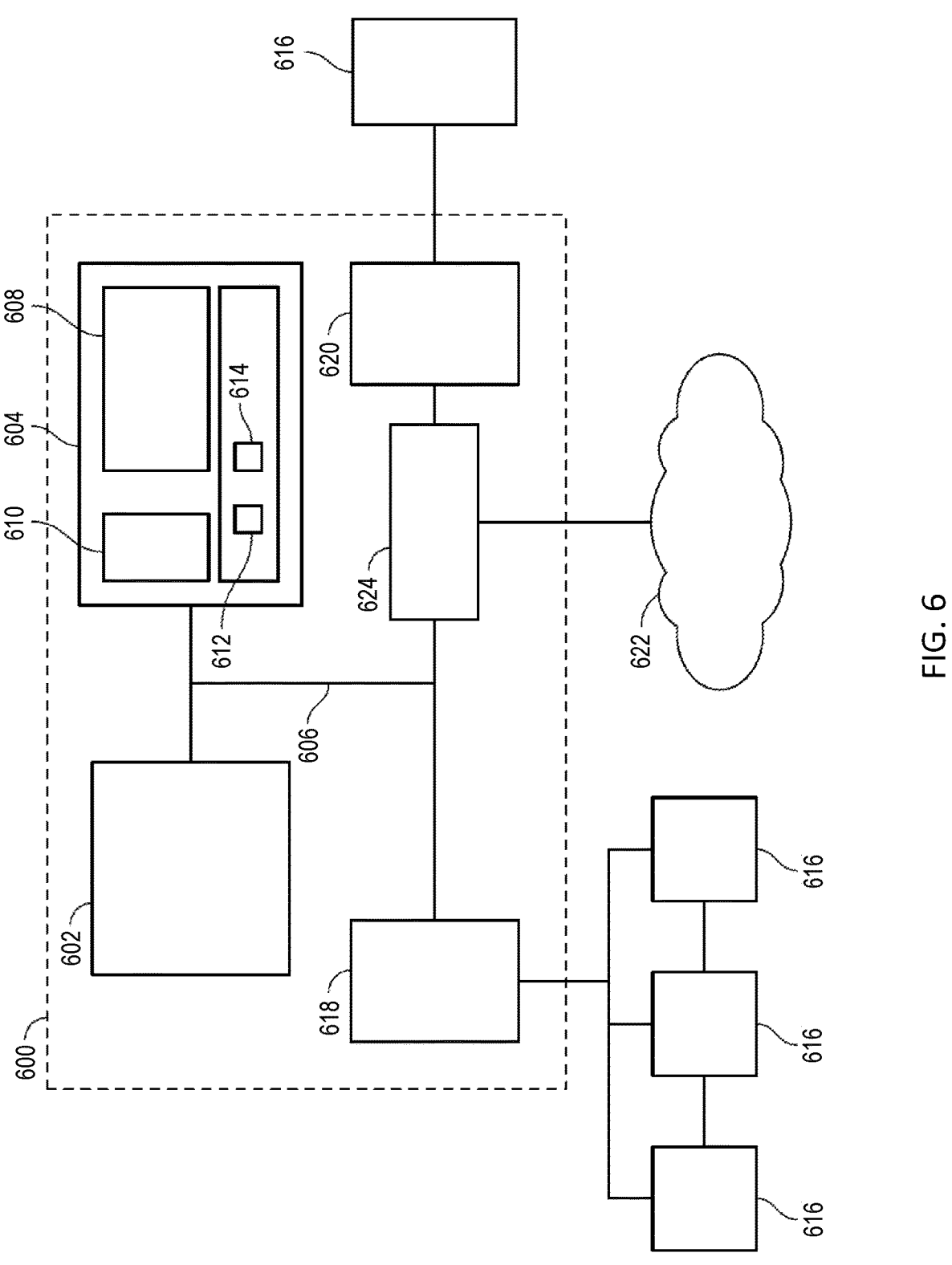
FIG. 6. is a computer system according to one or more embodiments.

FIG. 6 illustrates aspects of an embodiment of a computer system 600 that can perform various aspects of embodiments described herein. In some embodiments, the computer system 600 can be incorporated within or in combination with a battery pack (e.g., the battery pack 108 of FIG. 1) having one or more battery modules (e.g., the battery module 300 of FIG. 3). In some embodiments, the computer system 600 can be configured to receive a signal (e.g., a cell skin temperature signal) from a sensor of a pre-formed thermal barrier of one or more battery modules (e.g., the sensor 502 of the pre-formed thermal barrier 200 shown in FIG. 5).

The computer system 600 includes at least one processing device 602, which generally includes one or more processors for performing a variety of functions, such as, for example, controlling power delivery of an electric motor (e.g., the electric motor 106 of FIG. 1) to one or more wheels of a vehicle (e.g., the vehicle 100), controlling charge/discharge rates of one or more batteries (e.g., the battery pack 108 of FIG. 1), and/or monitoring a status of the one or more batteries. More specifically, the computer system 600 can include the logic necessary to receive a temperature signal from the pre-formed thermal barrier 200 and to take appropriate action, such as, for example, slowing a charging rate, cutting voltage, and/or isolating one or more battery packs and/or cells of the vehicle 100.

Components of the computer system 600 include the processing device 602 (such as one or more processors or processing units), a system memory 604, and a bus 606 that couples various system components including the system memory 604 to the processing device 602. The system memory 604 may include a variety of computer system readable media. Such media can be any available media that is accessible by the processing device 602, and includes both volatile and non-volatile media, and removable and non-removable media.

For example, the system memory 604 includes a non-volatile memory 608 such as a hard drive, and may also include a volatile memory 610, such as random access memory (RAM) and/or cache memory. The computer system 600 can further include other removable/non-removable, volatile/non-volatile computer system storage media.

The system memory 604 can include at least one program product having a set (e.g., at least one) of program modules that are configured to carry out functions of the embodiments described herein. For example, the system memory 604 stores various program modules that generally carry out the functions and/or methodologies of embodiments described herein. A module or modules 612, 614 may be included to perform functions related to monitoring and/or control of the battery pack 108 and any pre-formed thermal barriers 200, such as, for example, determining one or more current cell temperatures, a current charge state for one or more electronic devices and/or the vehicle 100, a charging duration, a charging current and/or voltage, etc. The computer system 600 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to stop charging and/or otherwise isolate one or more cells of a battery pack of the vehicle 100.

The processing device 602 can also be configured to communicate with one or more external devices 616 such as, for example, a keyboard, a pointing device, and/or any devices (e.g., a network card, a modem, vehicle ECUs, etc.) that enable the processing device 602 to communicate with one or more other computing devices. Communication with various devices can occur via Input/Output (I/O) interfaces 618 and 620.

The processing device 602 may also communicate with one or more networks 622 such as a local area network (LAN), a general wide area network (WAN), a bus network and/or a public network (e.g., the Internet) via a network adapter 624. In some embodiments, the network adapter 624 is or includes an optical network adaptor for communication over an optical network. It should be understood that although not shown, other hardware and/or software components may be used in conjunction with the computer system 600. Examples include, but are not limited to, microcode, device drivers, redundant processing units, external disk drive arrays, RAID systems, and data archival storage systems, etc.

Figure 7:
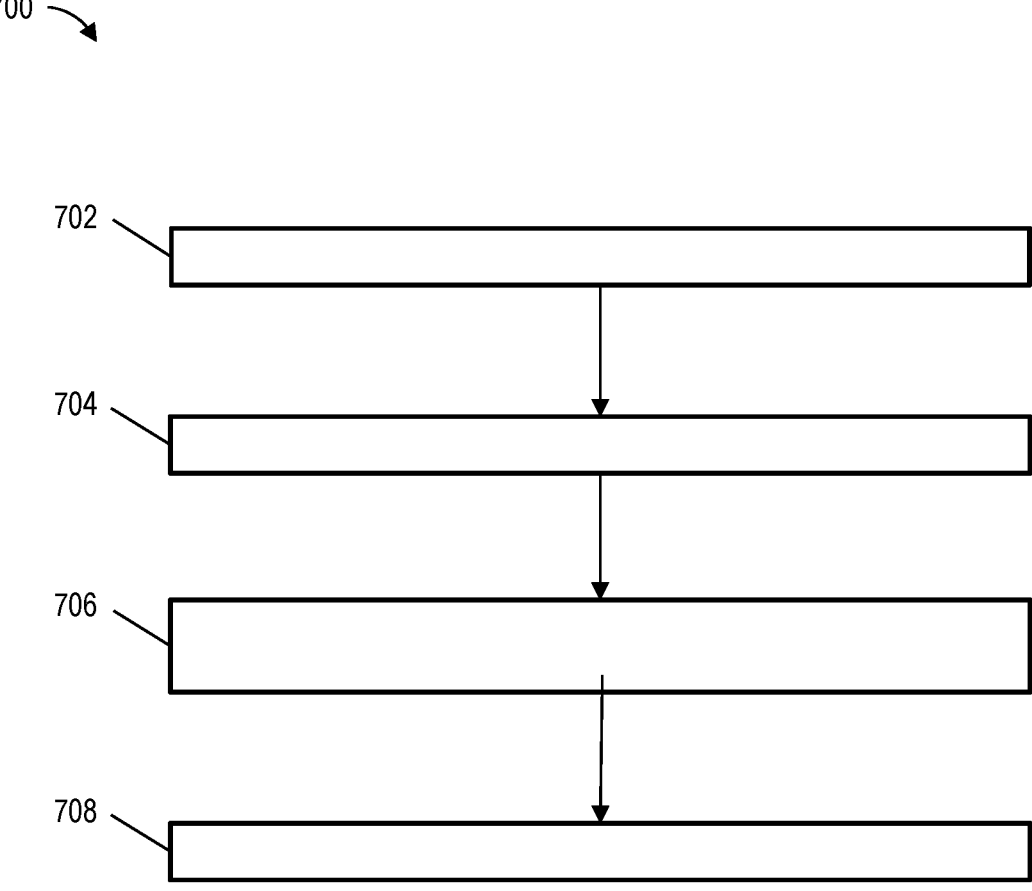
FIG. 7 is a flowchart in accordance with one or more embodiments.

Referring now to FIG. 7, a flowchart 700 for providing a thermal barrier for a battery module is generally shown according to an embodiment. The flowchart 700 is described in reference to FIGS. 1 to 6 and may include additional steps not depicted in FIG. 7. Although depicted in a particular order, the blocks depicted in FIG. 7 can be rearranged, subdivided, and/or combined.

At block 702, a plurality of conductively coupled electrochemical cells is provided. In some embodiments, the electrochemical cells are arranged in an N×M array.

At block 704, a pre-formed thermal barrier including a cured potting material is formed. In some embodiments, the pre-formed thermal barrier includes one or more cell cavities. In some embodiments, each cell cavity includes a cell holder dimension corresponding to one cell of the plurality of conductively coupled electrochemical cells.

At block 706, a cell holder is formed. In some embodiments, the cell holder is configured to receive the plurality of conductively coupled electrochemical cells and the pre-formed thermal barrier. At block 708, the pre-formed thermal barrier is inserted into a cell-to-cell space in the battery module.

In some embodiments, the pre-formed thermal barrier includes one or more locking features configured to physically interlock with one or more corresponding locking features of the cell holder.

In some embodiments, the cell holder includes a top cell holder and a bottom cell holder. In some embodiments, a first locking feature of the pre-formed thermal barrier includes a first extension, and wherein the top cell holder and the bottom cell holder each include a second locking feature adapted to conformally house the first locking feature when the pre-formed thermal barrier is installed in the cell holder.

In some embodiments, the pre-formed thermal barrier (refer to block 704) and the cell holder (refer to block 706) are formed monolithically. That is, the pre-formed thermal barrier and the cell holder can be formed concurrently during a single operation. In some embodiments, the cured potting material includes a foam and the cell holder includes a material having a higher density and/or higher stiffness than the foam. In this manner, the outside cell holder material can be made of a material having an increased stiffness (compared, e.g., to the foam) for structural support, while the inside, cured potting material near the battery cells can be made of compliant foam for improved thermal barrier functionality.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery module comprising:
   a plurality of conductively coupled electrochemical cells;
   a pre-formed thermal barrier comprising a first locking feature that extends from a sidewall of the pre-formed thermal barrier; and
   a cell holder configured to receive the plurality of conductively coupled electrochemical cells and the pre-formed thermal barrier, the cell holder comprising a top cell holder and a bottom cell holder, the top cell holder and the bottom cell holder each having sidewalls corresponding to the sidewall of the pre-formed thermal barrier, the respective sidewalls comprising respective portions of a shaped recess that, when the pre-formed thermal barrier is installed in the cell holder, collectively align to define a second locking feature that conformally houses the first locking feature, thereby physically interlocking the pre-formed thermal barrier to the cell holder;
   wherein the pre-formed thermal barrier comprises a cured potting material insertable into a cell-to-cell space in the battery module.

2. The battery module of claim 1, wherein the pre-formed thermal barrier comprises one or more cell cavities, and wherein each cell cavity comprises a cell holder dimension corresponding to one cell of the plurality of conductively coupled electrochemical cells.

3. The battery module of claim 1, wherein the pre-formed thermal barrier further comprises a second potting material having a greater density than the cured potting material.

4. The battery module of claim 1, wherein the pre-formed thermal barrier further comprises one or more sensors embedded in the cured potting material.

5. The battery module of claim 1, the pre-formed thermal barrier further comprising a third locking feature that extends from a top surface of the pre-formed thermal barrier extension in a direction orthogonal to the sidewall of the pre-formed thermal barrier extension.

6. The battery module of claim 1, the pre-formed thermal barrier further comprising at least one structural insert having a higher rigidity than the cured potting material into which the least one structural insert is positioned.

7. The battery module of claim 6, wherein a density of the cured potting material is less than 0.25 g/cm$^3$ and a density of the at least one structural insert is greater than or equal to 0.25 g/cm$^3$.

8. A vehicle comprising:
   an electric motor; and
   a battery pack electrically coupled to the electric motor, the battery pack comprising one or more battery modules, each battery module comprising:
      a plurality of conductively coupled electrochemical cells;
      a pre-formed thermal barrier comprising a first locking feature that extends from a sidewall of the pre-formed thermal barrier extension; and
      a cell holder configured to receive the plurality of conductively coupled electrochemical cells and the pre-formed thermal barrier, the cell holder comprising a top cell holder and a bottom cell holder, the top cell holder and the bottom cell holder each having sidewalls corresponding to the sidewall of the pre-formed thermal barrier, the respective sidewalls comprising respective portions of a shaped recess that, when the pre-formed thermal barrier is installed in the cell holder, collectively align to define a second locking feature that conformally houses the first locking feature, thereby physically interlocking the pre-formed thermal barrier to the cell holder;

wherein the pre-formed thermal barrier comprises a cured potting material insertable into a cell-to-cell space in the battery module.

9. The vehicle of claim 8, wherein the pre-formed thermal barrier comprises one or more cell cavities, and wherein each cell cavity comprises a cell holder dimension corresponding to one cell of the plurality of conductively coupled electrochemical cells.

10. The vehicle of claim 9, wherein the pre-formed thermal barrier further comprises a second potting material having a greater density than the cured potting material.

11. The vehicle of claim 8, wherein the pre-formed thermal barrier further comprises one or more sensors embedded in the cured potting material.

12. The vehicle of claim 8, the pre-formed thermal barrier further comprising a third locking feature that extends from a top surface of the pre-formed thermal barrier extension in a direction orthogonal to the sidewall of the pre-formed thermal barrier extension.

13. The vehicle of claim 8, the pre-formed thermal barrier further comprising at least one structural insert having a higher rigidity than the cured potting material into which the least one structural insert is positioned.

14. The vehicle of claim 13, wherein a density of the cured potting material is less than 0.25 g/cm$^3$ and a density of the at least one structural insert is greater than or equal to 0.25 g/cm$^3$.

15. A method for providing a thermal barrier for a battery module, the method comprising:

providing a plurality of conductively coupled electro-chemical cells;

forming a pre-formed thermal barrier comprising a cured potting material, the pre-formed thermal barrier further comprising a first locking feature that extends from a sidewall of the pre-formed thermal barrier;

forming a cell holder configured to receive the plurality of conductively coupled electrochemical cells and the pre-formed thermal barrier, the cell holder comprising a top cell holder and a bottom cell holder, the top cell holder and the bottom cell holder each having sidewalls corresponding to the sidewall of the pre-formed thermal barrier, the respective sidewalls comprising respective portions of a shaped recess that, when the pre-formed thermal barrier is installed in the cell holder, collectively align to define a second locking feature that conformally houses the first locking feature, thereby physically interlocking the pre-formed thermal barrier to the cell holder; and inserting the pre-formed thermal barrier into a cell-to-cell space in the battery module.

16. The method of claim 15, wherein the pre-formed thermal barrier comprises one or more cell cavities, and wherein each cell cavity comprises a cell holder dimension corresponding to one cell of the plurality of conductively coupled electrochemical cells.

17. The method of claim 15, wherein the pre-formed thermal barrier and the cell holder are monolithically formed, wherein the cured potting material comprises a foam, and wherein the cell holder comprises a material having a higher density than the foam.

18. The method of claim 15, the pre-formed thermal barrier further comprising a third locking feature that extends from a top surface of the pre-formed thermal barrier extension in a direction orthogonal to the sidewall of the pre-formed thermal barrier extension.

19. The method of claim 15, the pre-formed thermal barrier further comprising at least one structural insert having a higher rigidity than the cured potting material into which the least one structural insert is positioned.

20. The method of claim 19, wherein a density of the cured potting material is less than 0.25 g/cm$^3$ and a density of the at least one structural insert is greater than or equal to 0.25 g/cm$^3$.

\* \* \* \* \*